(12) United States Patent
Storm et al.

(10) Patent No.: US 8,561,714 B2
(45) Date of Patent: Oct. 22, 2013

(54) HAND-HELD POWER TOOL

(75) Inventors: Thomas Storm, Dresden (DE); Frank Eichelroth, Dresden (DE); Bernhard Hegemann, Filderstadt (DE); Thomas Bernhardt, Aichtal-Groetzingen (DE); Holger Ruebsaamen, Stuttgart (DE); Andreas Schlegel, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 12/745,422

(22) PCT Filed: Sep. 29, 2008

(86) PCT No.: PCT/EP2008/063024
§ 371 (c)(1),
(2), (4) Date: May 28, 2010

(87) PCT Pub. No.: WO2009/068344
PCT Pub. Date: Jun. 4, 2009

(65) Prior Publication Data
US 2010/0300715 A1    Dec. 2, 2010

(30) Foreign Application Priority Data

Nov. 29, 2007 (DE) .......................... 10 2007 057 453

(51) Int. Cl.
| B25B 21/02 | (2006.01) |
| E21B 7/00 | (2006.01) |
| E21B 3/00 | (2006.01) |
| E21B 17/22 | (2006.01) |
| E21B 19/16 | (2006.01) |
| E21B 19/18 | (2006.01) |

(52) U.S. Cl.
USPC ............................... 173/1; 173/217

(58) Field of Classification Search
USPC .................... 173/48, 29, 90, 1, 217
See application file for complete search history.

(56) References Cited

U.S. PATENT DOCUMENTS

| 2,768,036 | A | * | 10/1956 | Greenough ................... 277/448 |
| 3,393,441 | A | * | 7/1968 | Gebhart .......................... 29/256 |
| 3,787,059 | A | * | 1/1974 | McCormick .................. 277/435 |
| 4,129,921 | A | * | 12/1978 | Greene ............................... 16/38 |
| 4,293,170 | A | * | 10/1981 | Brezosky ...................... 384/275 |
| 4,784,438 | A | * | 11/1988 | Fikse ............................. 299/110 |
| 4,932,814 | A | * | 6/1990 | York ............................. 408/1 R |
| 5,104,008 | A | * | 4/1992 | Crisci ....................... 222/153.07 |
| 5,199,833 | A | * | 4/1993 | Fehrle et al. .............. 408/239 R |
| 5,222,963 | A | * | 6/1993 | Brinkerhoff et al. ......... 606/153 |
| 5,284,285 | A | * | 2/1994 | Ferguson ........................ 226/74 |
| 5,403,041 | A | * | 4/1995 | Merkel et al. ..................... 285/4 |
| 5,791,212 | A | * | 8/1998 | Han ................................. 81/453 |
| 5,941,360 | A | * | 8/1999 | Putney et al. ................. 192/150 |
| 6,035,945 | A | * | 3/2000 | Ichijyou et al. ................. 173/48 |

(Continued)

FOREIGN PATENT DOCUMENTS

| DE | 19801986 A1 | 10/1998 |
| DE | 102005026614 A1 | 12/2006 |

*Primary Examiner* — Robert Long
(74) *Attorney, Agent, or Firm* — Maginot, Moore & Beck

(57) ABSTRACT

The invention relates to a hand-held power tool having a bearing race inserted into a bearing socket. The bearing socket and the bearing race have recessed ring sectors positioned relative to one another in an overlapping manner. The ring sector of the bearing race is configured by breaking out a circumferential section of the bearing race, which is defined by predetermined breaking points.

9 Claims, 4 Drawing Sheets

(56) References Cited

U.S. PATENT DOCUMENTS

Figure 1:
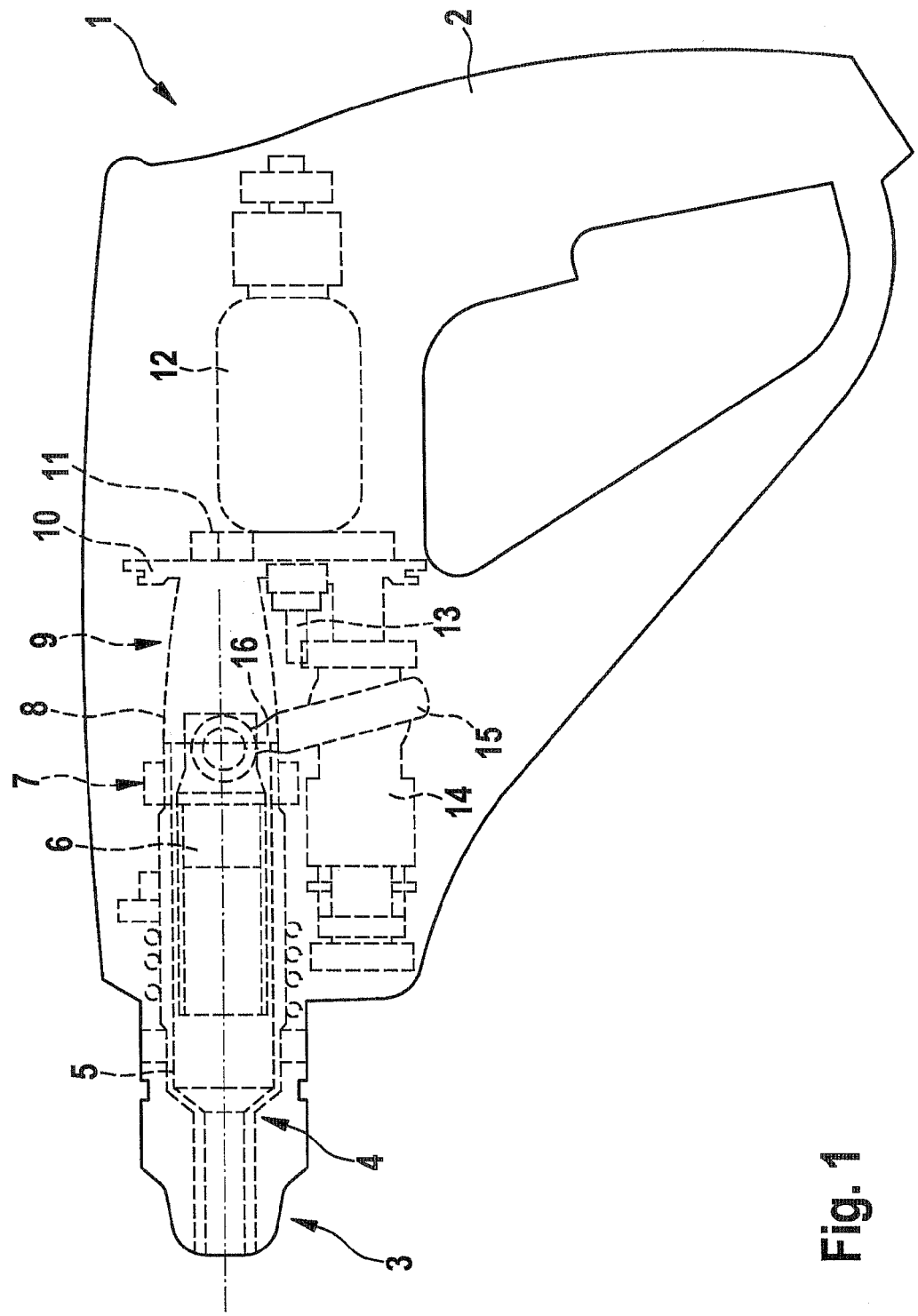

| | | | |
|---|---|---|---|
| 6,082,233 A * | 7/2000 | Han | 81/453 |
| 6,287,011 B1 * | 9/2001 | Hartl et al. | 384/503 |
| 6,601,749 B2 * | 8/2003 | Sullivan et al. | 227/180.1 |
| 6,824,491 B2 * | 11/2004 | Chen | 475/266 |
| 6,921,383 B2 * | 7/2005 | Vitello | 604/111 |
| 7,028,786 B2 * | 4/2006 | Kuhnle et al. | 173/131 |
| 7,410,084 B1 * | 8/2008 | Reed | 227/119 |
| 7,510,195 B2 * | 3/2009 | Usui et al. | 277/435 |
| 7,698,979 B2 * | 4/2010 | Sugizaki et al. | 83/140 |
| 7,762,988 B1 * | 7/2010 | Vitello | 604/111 |
| 8,070,504 B2 * | 12/2011 | Amidon et al. | 439/321 |
| 8,235,751 B2 * | 8/2012 | Amidon et al. | 439/578 |
| 2004/0130106 A1 * | 7/2004 | Dembicks et al. | 279/60 |
| 2006/0006614 A1 * | 1/2006 | Buchholz et al. | 279/19 |
| 2006/0022454 A1 * | 2/2006 | Le Clinche et al. | 285/93 |
| 2006/0244224 A1 * | 11/2006 | Zhou et al. | 279/62 |
| 2007/0007026 A1 * | 1/2007 | Hofmann | 173/216 |
| 2007/0007229 A1 * | 1/2007 | Yousif | 215/232 |
| 2008/0016983 A1 * | 1/2008 | Saur | 74/813 R |
| 2010/0101814 A1 * | 4/2010 | Bernhardt et al. | 173/90 |
| 2011/0005355 A1 * | 1/2011 | Brennenstuhl et al. | 81/57.38 |
| 2011/0259623 A1 * | 10/2011 | Yoshikane et al. | 173/176 |

* cited by examiner

HAND-HELD POWER TOOL

CROSS-REFERENCE TO RELATED APPLICATION

This application is a 35 USC 371 application of PCT/EP2008/063024 filed on Sep. 29, 2008.

BACKGROUND OF THE INVENTION

1. Field of the Invention

The invention relates to a hand-held power tool as well as an assembly process for it.

2. Description of the Prior Art

Hand-held power tools of the type mentioned above, with an output element that is guided in a bearing race, which is situated in an annular, encompassing bearing socket, are known from practical experience. The part of the bearing socket surrounding the bearing race is constituted by the free end of a neck of an intermediate flange through which the output element extends. A radial access to the output element, whether for drive purposes and/or in connection with the assembly process, is only possible outside the region of the bearing socket due to the closed embodiment of the bearing race and bearing socket. This has a negative impact on assembly options and on the possibilities for access to the output element on the drive side and requires a corresponding overall length for the intermediate flange in the positioning of the drive access in the region of the intermediate flange.

The as yet unpublished German patent application DE 10 2007 014 758 has already proposed having the bearing socket and bearing race for an output element in a hand-held power tool be embodied in the form of an open ring when cut-out ring segments are situated congruent to each other.

OBJECT AND SUMMARY OF THE INVENTION

Based on a hand-held power tool of the type mentioned at the beginning, the object of the invention is to expand the possibilities for accessing the output element without thereby complicating the installation of the bearing race in the bearing socket and/or negatively impacting the guidance quality of the bearing race for the output element.

In the hand-held power tool according to the invention, the bearing socket and the bearing race are embodied in the form of an open ring, with cut-out ring sectors that are situated congruent to each other and the cut-out ring sector of the bearing race is embodied so that a circumference segment—which is delimited by detachment points, in particular desired fracture points—is detached, in particular broken out.

This embodiment of the bearing race makes it possible not only to manufacture it as a closed bearing race, but also to insert it in a precisely fitting way into the surrounding circular or oval annular bearing socket so that regardless of manufacture-dictated and/or material-dictated inherent stresses, the bearing race is in its desired shape for the insertion into the bearing socket and due to the support of the bearing socket, maintains the manufactured shape that is designed for being supported in a dimensionally stable fashion in the bearing socket even when the open ring form is produced by removing, in particular breaking out, the circumference section delimited by detachment points, in particular desired fracture points.

As a result, the same installation prerequisites exist as for a closed bearing race and, in accordance with matching dimensional ratios, the bearing race can be inserted without hindrance into the bearing socket in accordance with the respective fit conditions present. Any material-dictated and/or manufacture-dictated inherent stresses in the bearing race that could result in deviations from the predetermined desired shape in the case of the open ring form thus continue to have no effect on the installation and lastly, have no negative effect on the guidance quality of the bearing race for the output element even after the breaking-out of the circumference section delimited by the desired fracture points, since for the bearing race that is now open, the bearing socket constitutes a dimensionally stable support that is also sufficient for the optional form-locked anchoring of the bearing race in the bearing socket. For such an anchoring, in particular a rotationally-fixed mounting, of the bearing race, it is also optionally possible for grooves to be additionally provided, preferably on the end surface, which cooperate with corresponding counterpart elements provided in the bearing socket to assure the required fixing and possibly also axial positioning of the bearing race.

The assembly method according to the invention is particularly suitable for bearing races that are preferably embodied in the form of slide bearing races composed of brittle materials, primarily brittle-fracturing materials. These materials particularly include sintered materials or other materials prone to brittle fracturing in which inherent stresses also arise during manufacture, which can result in deviations from the desired shape when the bearing race is in the broken-open state.

Furthermore, the invention also relates to a bearing race as such that has a ring section—which is delimited by detachment points, in particular desired fracture points, and is to be detached, in particular broken out—that can in particular be used in hand-held power tools of the above-mentioned type as well as in connection with an above-mentioned assembly method and which, despite its provided use as an open bearing race, is to be produced in a closed form and thus can also be composed of materials in which, as in sintered materials, inherent stresses can arise during their manufacture and could result in deformations in the discontinuous, i.e. open, bearing race.

In the scope of the invention, the desired fracture points can be embodied in the form of notches provided in the inner and/or outer circumference of the bearing race, possibly notches that are situated congruent to each other, so that only comparatively thin bridge pieces remain.

In connection with notches provided on one side, in particular on the inside, it can be useful to provide a thickened region on the outer circumference of the bearing race in the region coinciding with each notch in order, during the manufacture, to achieve a continuous, essentially uniform material cross section regardless of the presence of the notch. The thickened region can be easily removed after the manufacture, for example after the pressing procedure when using sintered materials, by means of grinding, stripping, or similar machining procedures.

With regard to the rotary securing of the bearing race, it can be useful to also provide it with notches in the end surface, which are associated with corresponding counterpart elements on the respective bearing socket.

Other advantages and suitable embodiments can be inferred from the description of the figures, and from the drawings.

BREIF DESCRIPTION OF THE DRAWINGS

Figure 2:
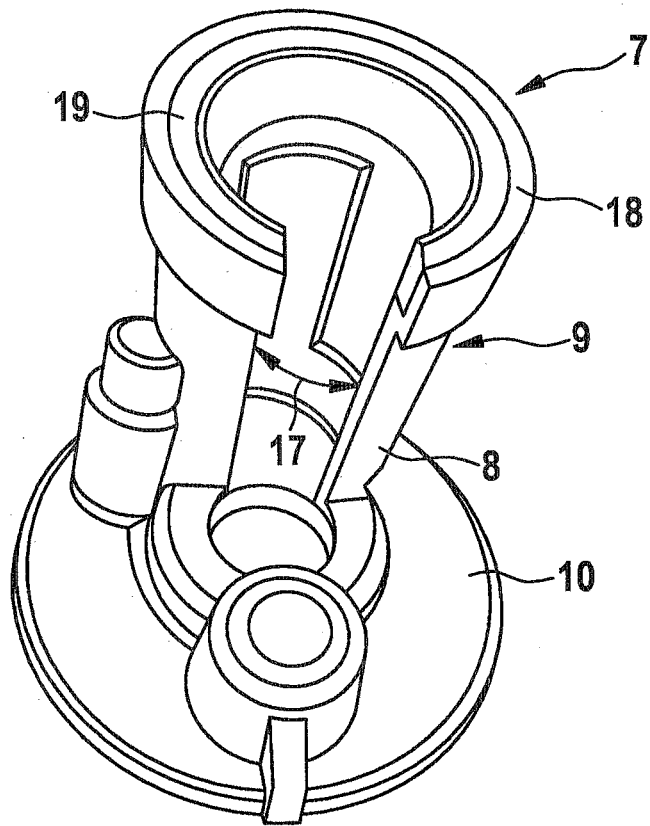
Figure 3:
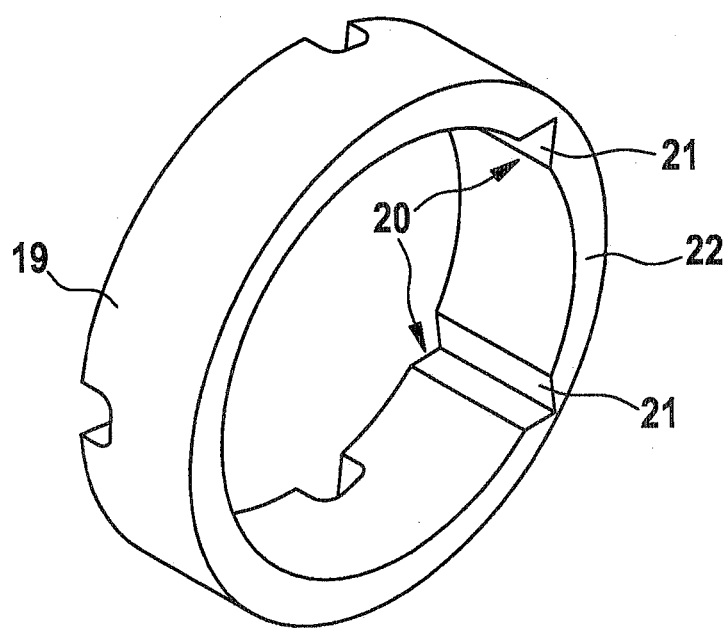
Figure 4:
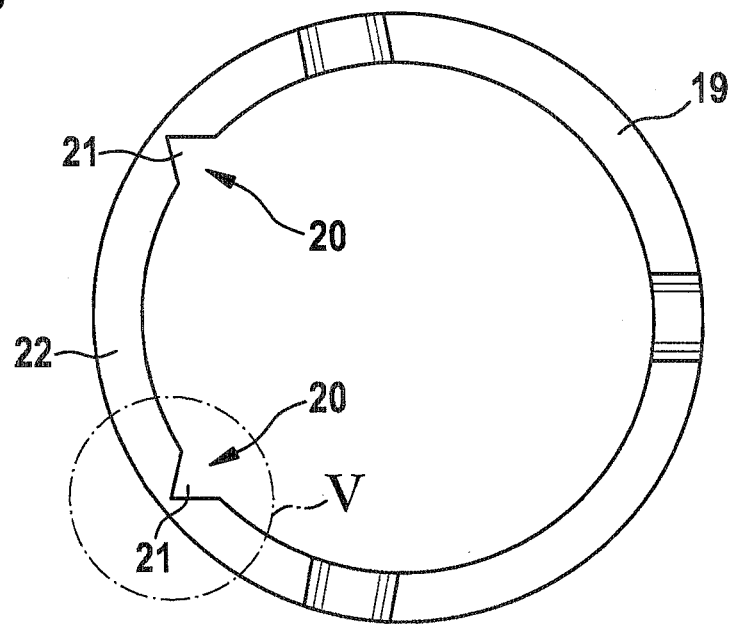
Figure 5:
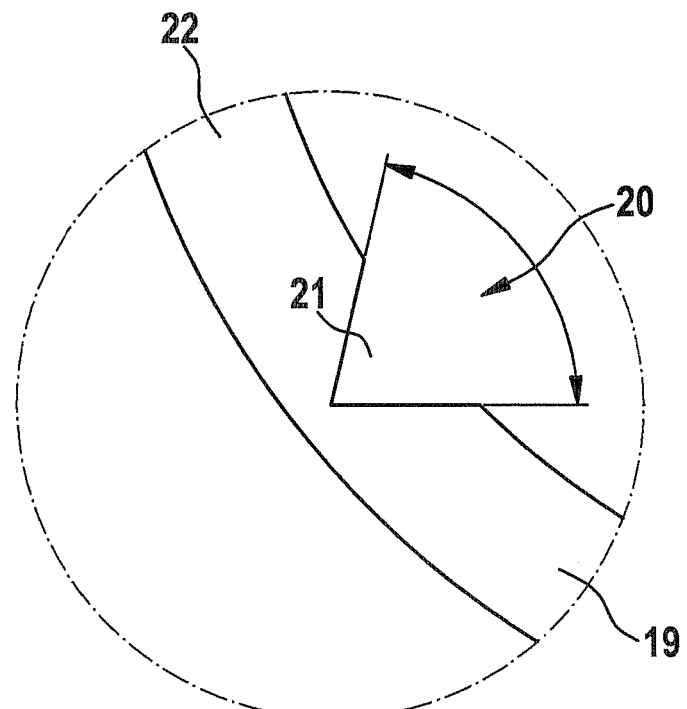
Figure 6:
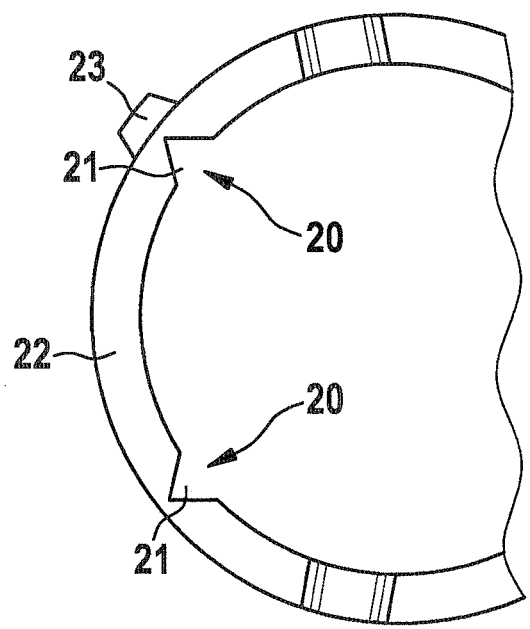
Figure 7:
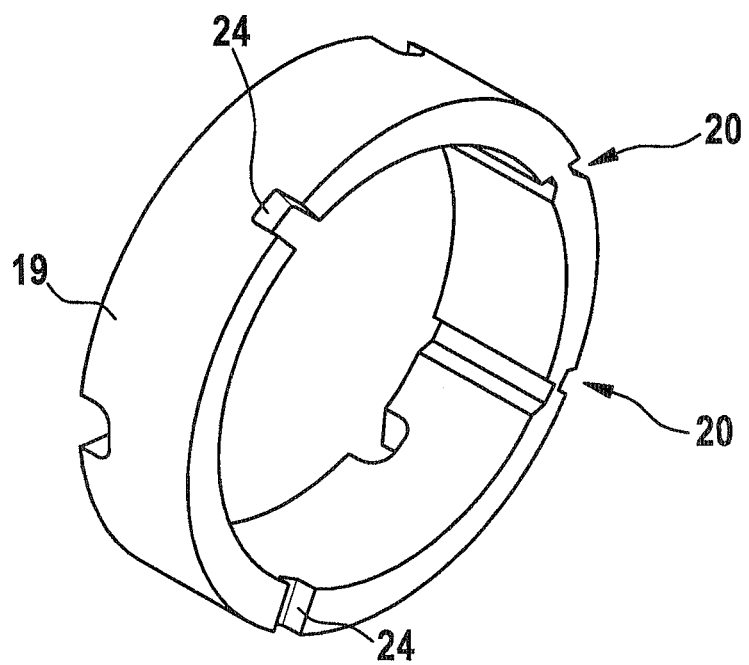

Exemplary embodiments of the invention are described in further detail in the ensuing description in conjunction with the drawings, in which:

FIG. 1 is a simplified depiction of a rotary hammer as an example of a hand-held power tool embodied according to the invention, FIG. 2 is a perspective depiction of an intermediate flange of the rotary hammer, which, terminating its end oriented toward the tool, has a bearing with a bearing socket for a bearing race, which guides the output element to be connected to the tool, FIGS. 3 and 4 show the bearing race in a perspective view and a view from the end surface, FIG. 5 is an enlarged depiction of the detail V from FIG. 4, FIG. 6 is an enlarged partial top view of a bearing race in which a region of the bearing race that is notched on the inside is thickened on the outside, and FIG. 7 is another perspective depiction of a bearing race.

DESCRIPTION OF THE PREFERRED EMBODIMENTS

The hand-held power tool is schematically depicted in FIG. 1 in the form of a rotary hammer 1, which at its working end 3 remote from the handle 2 has a tool holder associated with an output element 4. The output element 4 is embodied in the form of a hammer tube 5, which, to the rear of the tool holder, accommodates a hammer piston 6 that is driven in an oscillating fashion, in particular oscillating in a reciprocating fashion, and is supported at its end remote from the tool holder by means of a bearing position 7 on the neck 8 of an intermediate flange 9. The intermediate flange 9 has a base plate 10 that is connected to the output side end plate 11 of the electric motor 12 provided as the drive unit, whose output shaft 13 drives an intermediate shaft 14. By means of a wobble bearing 15, the intermediate shaft 14 drives a wobble pin 16 that reaches through the neck 8 of the intermediate flange 9 to engage the hammer piston 6. In accordance with the wobbling motion, i.e. the reciprocating pivoting motion of the wobble pin 16, the annular neck 8 through which the wobble pin 16 reaches, according to FIG. 2, has a cut-out extending for at least a significant portion of its length and across a ring sector 17; this cut-out also extends across the region of the bearing position 7, which is provided at the end of the neck 8 opposite from the base plate 10 of the intermediate flange 9. This bearing position 7 is constituted by a bearing socket 18 that is offset toward the outside in stepped fashion, into which a bearing race 19 is inserted; in the depiction according to FIG. 2, the cut-out ring sector 17 is depicted as extending continuously and for essentially the same span across the neck 8 and the bearing position 7.

With regard to the intermediate flange 9, the cut-out of the circumference section corresponding to the ring sector 17 can be embodied in the usual way during manufacture, for example by means of the die-casting method. However, it is also possible for a circumference section—which corresponds to the ring sector 17 to be cut out—to be removed, in particular machined out or broken out, from the neck 8 of the intermediate flange 9, which is initially closed.

The bearing race 19 is inserted axially into the bearing socket 18 that is opened by means of the cut-out ring sector 17, in fact in the form of a closed bearing race whose circumference section 22 situated congruent to the cut-out circumference section of the bearing socket 18 is delimited by detachment points, in particular desired fracture points 20, as shown in a closed bearing race in FIGS. 3 through 7. In the depiction according to FIG. 3, the ring sector 17 of the bearing race 19 to be cut out is comprised of a circumference section 22 that is delimited by wedge-shaped notches 21 and is to be broken out.

The bearing race 19, which like the bearing socket can have a circular or oval shape, is first inserted into the bearing socket 18 in the form of a closed ring and with the circumference section 22 to be broken out positioned congruent to the cut-out ring sector 17 of the bearing race 19, preferably in a precisely fitting way, so that a dimensionally stable support for the bearing race 19 is provided, which is only missing in the region of the ring sector 17 to be cut out, and the circumference section 22 of the bearing race 19 can be broken out along the desired fracture points 20 and detached from the ring piece without impairing the dimensional stability of the bearing race 19.

FIGS. 3 through 5 show the embodiment of the desired fracture points 20 provided as detachment points and embodied in the form of acute-angled notches 21, as shown with particular clarity in the enlarged depiction in FIG. 5, and the closed bearing race 19 whose circumferential shape corresponds to that of the bearing socket 18 has only a relatively small wall thickness remaining at the bottom of the notch. The notch angle in the depiction in FIG. 4 is preferably approximately 60 to 80°.

If such an embodiment of desired fracture points 20 by means of wedge-shaped notches 21 that significantly reduce the wall thickness of the bearing race 19 or in the form of channel-shaped, rounded, or groove-shaped rectangular recesses leads to difficulties in producing the bearing race 19, which can be the case particularly if the bearing race 19 is produced by casting or sintering, then according to the invention, the circumference region on the other side from the recess of each notch 21, which is in particular wedge-shaped, can be provided with a thickened region 23 as shown in FIG. 6 so that in the region of the notches 21 as well, the thickened region 23 initially provides a wall cross section that corresponds to the wall thickness of the rest of the bearing race 19. The thickened region 23 whose removal is required for insertion into the bearing socket 18 can then be abraded away, for example by means of grinding, stripping, or the like so that with this production-dictated embodiment of the still-closed bearing race 19, once the thickened region 23 is abraded away, the bearing race 19 can be inserted into the bearing socket 18 in the above-described way.

Basically, it is also possible to abrade away the thickened region 23 only in the region coinciding with the circumference region to be broken out and thus to embody projections in the transition from the cut-out circumference region 22 on the bearing race 19, which projections, by engaging radially over or in the bearing socket 18, assure a rotational fixing of the bearing race 19.

Such a rotational fixing can also be achieved in a different way, for example according to FIG. 7, by means of recesses 24 on the end surface of the bearing race 19, for which corresponding counterpart elements, not shown, are provided on the bearing socket.

The foregoing relates to the preferred exemplary embodiments of the invention, it being understood that other variants and embodiments thereof are possible within the spirit and scope of the invention, the latter being defined by the appended claims.

The invention claimed is:

1. A method for assembling a hand-held power tool, the power tool including an output element that is configured to accommodate a tool and that is guided in an annular bearing, the bearing having an inner surface and an outer surface extending axially and being configured to be seated in an annular bearing socket, the bearing socket having a first cut-out sector formed in its circumference that opens the bearing socket, the method comprising:

inserting the bearing into the bearing socket, the bearing having two notches formed along one or more of the inner surface and the outer surface, the notches spaced apart on the circumference of the bearing to define a circumference section therebetween, the bearing being inserted into the bearing socket such that the circumference section and the first cut-out sector are congruent; and with the bearing in the bearing socket, fracturing the bearing at the notches to remove the circumference section of the bearing to form a second cut-out sector that opens the bearing and that is congruent with the first cut-out sector of the bearing socket, wherein the bearing is thickened on the outer surface in a region that coincides with at least one of its notches provided on the inner surface and the thickened region is removed before insertion of the bearing into the bearing socket.

2. The method for assembling as recited in claim 1, wherein an outline of the thickened region, before it is removed, follows an outline of the notch.

3. The method for assembling as recited in claim 2, wherein, before removal of the thickened region, a wall thickness of the bearing race between the inner and outer surfaces is approximately equal in the region of the notch due to a presence of the thickened region situated to coincide with the notch.

4. A method for assembling a hand-held power tool, the power tool including an output element that is configured to accommodate a tool and that is guided in an annular bearing, the bearing having an inner surface and an outer surface extending axially and being configured to be seated in an annular bearing socket, the bearing socket having a first cut-out sector formed in its circumference that opens the bearing socket, the method comprising:

engaging the outer surface of the bearing with an inner surface of the bearing socket, the bearing having two detachment features formed along one or more of the inner surface and the outer surface, the detachment features spaced apart on the circumference of the bearing to define a circumference section therebetween, the bearing being inserted into the bearing socket such that the circumference section and the first cut-out sector are congruent; and with the bearing in the bearing socket, fracturing the bearing at the detachment features to remove the circumference section of the bearing to form a second cut-out sector that opens the bearing and that is congruent with the first cut-out sector of the bearing socket.

5. The method for assembling as recited in claim 4, wherein the bearing is thickened on its surface in a region that coincides with at least one of its detachment features provided on the opposing surface, and wherein the thickened region is removed before insertion of the bearing into the bearing socket.

6. The method for assembling as recited in claim 5, wherein an outline of the thickened region, before it is removed, follows an outline of the detachment feature.

7. The method for assembling as recited in claim 6, wherein, before removal of the thickened region, a wall thickness of the bearing between the inner and outer surfaces is approximately equal in the region of the detachment feature due to the thickened region coinciding with the detachment feature.

8. The method for assembling as recited in claim 4, wherein the detachment features are notches.

9. A method for assembling a hand-held power tool, the power tool including a annular bearing configured to be seated in an annular bearing socket, the bearing having an inner surface and an outer surface extending axially and being further configured to be held in the bearing socket in a precisely fitting, form-locked, fashion, the bearing socket having a cut-out sector formed in its circumference that opens the bearing socket, the method including:

inserting the bearing into the bearing socket, the bearing having two detachment features formed along one or more of the inner surface and the outer surface, the detachment features spaced apart on the circumference of the bearing to define a circumference section therebetween, the bearing being inserted into the bearing socket such that the circumference section and the first cut-out sector are congruent; and after insertion of the bearing into the bearing socket, detaching the circumference section by breaking the circumference section out from the bearing, the bearing remaining within the bearing socket after detachment of the circumference section.

\* \* \* \* \*